Patented July 12, 1949

2,476,127

UNITED STATES PATENT OFFICE 2,476,127

REACTION PRODUCT OF A POLYMETHYLOL MELAMINE AND AN AROMATIC AMINE

Herbert J. West, Pittsburgh, Pa., assignor to American Cyanamid Company, New York, N. Y., a corporation of Maine No Drawing. Application June 7, 1946, Serial No. 675,297

1 Claim. (Cl. 260—45.2)

This invention relates to the preparation of derivatives of polymethylol melamines. More particularly, the invention relates to the reaction products obtained by condensing an aromatic amine with a polymethylol melamine.

An object of the present invention is to prepare new and useful compounds.

Another object of the present invention is to prepare new compounds by condensing an aromatic amine with a polymethylol melamine.

A further object is to prepare compounds which are useful in the preparation of resins suitable for use in adhesives, coating compositions, impregnating compositions, molding compositions and the like.

These and other objects are attained as described herein.

According to the present invention, new and useful compounds are obtained by reacting a primary or secondary aromatic amine, such as aniline, toluidine, methyl aniline, dimethyl aniline, diphenyl aniline, and the like with a polymethylol melamine having the following general structural formula:

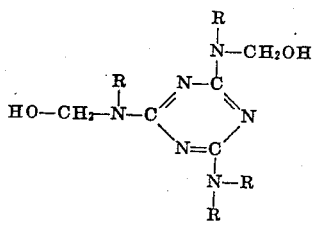

where each R represents hydrogen or a —CH₂OH group.

The products obtained by this reaction may be represented by the probable structural formula:

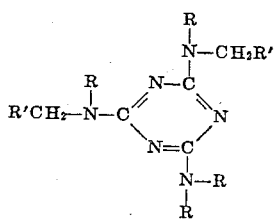

where R is a member of the group consisting of hydrogen, methylol radical or an N-methylene amino radical, and R' is a member of the group consisting of hydroxyl and aryl amino radicals and at least one R' is an aryl amino radical.

The products of the condensation of aniline with methylol melamine may be illustrated by the probable structural formula:

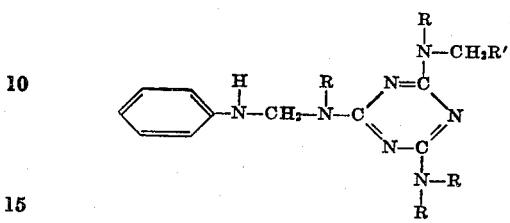

where R is a member of the group consisting of hydrogen, a methylol radical or an N-methylene phenyl amino radical, and R' is a member of the group consisting of an hydroxyl and a phenyl amino radical.

The products are prepared by reacting an aromatic amine and a polymethylol melamine compound. The reaction is preferably carried out in the temperature range of from about 50° C. to 120° C. with or without the use of solvents. Numerous derivatives of the reaction products may be formed by reactions such as alkylation, sulfonation, acylation, etherification, esterification, halogenation, and the like.

The new compounds, particularly the reaction products of aniline and polymethylol melamine, are highly useful as intermediates for the preparation of both thermosetting and thermoplastic resins. When the number of moles of aniline reacted with the polymethylol melamine is at least one less than the number of methylol groups, a product is obtained which gives a thermoset resin upon heating at about 120° C. or higher. When the number of moles of aniline reacted with the polymethylol melamine is equal to the number of methylol groups present, there results an intermediate product which gives a thermoplastic resin upon heating.

The compounds may be used for molding or as constituents of molding compositions containing various other thermosetting or thermoplastic resins with or without fillers or modifiers. The compounds, prior to curing, may be used in film forming compositions by reacting with fatty oil acids or by incorporation into alkyd resin reactant mixtures. Desirable film forming properties may also be obtained by alkylation, such as butylation, which renders the compounds more suitable for use in paints, varnishes, lacquers and the like. For use in the treatment of textiles the compounds may be readily etherified to give shrink-proof and crease-proof properties, for example, by converting the methylol compounds to their methylated methylol derivatives. As a further use in the textile field the new compounds may be acylated with long chain acids or their acid chlorides such as stearic acid or its acid chloride to give to fabrics the property of water repellency. The compounds may also be directed to use in the fixation of dyes to textiles and fabrics and in treatment of paper.

The compounds disclosed herein which are reacted with long chain hydrocarbon substituents favor solubility in oils and other hydrocarbon solvents whereas those containing a plurality of methylol groups favor solubility in such solvents as methyl, ethyl and butyl alcohols, acetone, methyl ethyl ketone, dioxane, and the like.

Various fillers, pigments and dyes may be admixed with the products of the present invention such as glass fibers, asbestos, zinc oxide, ferric oxide, malachite green and the like. Plasticizers may also be added to impart improved flow characteristics when used in molding. However, the thermoplastic products of the present invention act as plasticizers by themselves and may be advantageously utilized for such use in conjunction with thermosetting resins. To effect a more rapid curing of the various compositions, curing catalysts may also be incorporated into the mixtures. Many other modifications of the compositions may be made by the admixture of other resins such as modified or unmodified alkyd resins, melamine-formaldehyde resins, urea-formaldehyde resins, phenol formaldehyde resins, vinyl resins and the like.

The compounds of the present invention are especially useful in the production of moldings possessing good electrical properties and dimensional stability. They are particularly desirable to use in conjunction with phenolic or amino-resin molding compositions. Phenolic molding compounds generally have satisfactory dimensional stability but lack in electrical properties such as arc resistance. Amino molding compounds such as urea or melamine resins have good electrical properties but lack in dimensional stability. It has been found that the products of the present invention highly improve electrical properties when incorporated into phenolic compositions and also greatly improve dimensional stability when used in amino resin molding compositions. In addition, the new compounds exert a very desirable influence on the heat and flame resistance of products containing the same.

MOLDING COMPOSITION A

A molding composition is prepared by making a homogeneous mixture of 200 parts of a melamine-formaldehyde resin (prepared by reacting one mol of melamine with two mols of formaldehyde), 200 parts of an aniline-methylol melamine resin (prepared by heating the product obtained by reacting three mols of aniline with one mol of trimethylol melamine) and 600 parts of silica flour. The composition is molded at a pressure of 3000 pounds per square inch and a temperature of 300° F. for a period of 10 minutes. A comparison of the properties of the aniline-methylol-melamine-containing molded article, and a phenolic molded article, the latter being prepared to exhibit superior electrical properties, is shown as follows:

| | Molding Composition A | Phenolic High Frequency Material |
|---|---|---|
| ASTM Arc Resistance | 130–190 | (¹) |
| Dielectric Strength R. T. (volts/mil) | 500–650 | 325–450 |
| Power Factor (10⁶ cycles) | .005–.008 | .01–.03 |

¹ Too low to measure satisfactorily.

The following examples are given for the purpose of illustration and not in limitation. Obviously many variations may be made without departing from the spirit and scope of the present invention as defined in the appended claims. The term "parts" as used herein is used to express parts by weight.

*Example 1*

| | Parts |
|---|---|
| Tetramethylol melamine | 246 |
| Aniline | 93 |

The above materials are charged into a kettle and slowly heated. At about a temperature of 80° C. the reactants form a softened mass which completely goes into solution at about 110° C. The temperature thereon is maintained at about 100° C. for a half-hour. Upon cooling to room temperature a solid product is obtained. When the product is further heated above 120° C. a hard infusible thermoset material is obtained.

*Example 2*

| | Parts |
|---|---|
| Dimethylol melamine | 186 |
| Aniline | 93 |

The above materials are charged into a kettle and slowly heated. At 60° C. the mixture begins to form a soft mass and at 90° C. the mixture becomes more fluid. The mixture is heated to 110° C. to drive off the water formed by the condensation and then kept at a temperature of about 100° C. for a half-hour. Upon cooling to room temperature the product solidifies and on further heating above 120° C. a hard, infusible, thermoset material is obtained.

*Example 3*

| | Parts |
|---|---|
| Formalin (37% aqueous solution) | 534 |
| Melamine | 252 |
| Aniline | 186 |

The formalin and melamine are heated at about 85° C. until a clear solution forms. The aniline is then added and the mixture refluxed for about 35 minutes. A crystalline mass is formed which is dried for about 15 hours at 50° C. and about 6 hours at 80° C. Heating the product at about 150° C. causes it to slowly fuse and after a few minutes sets to an insoluble and infusible product.

I claim:

The process for preparing a tetra-methylol melamine reaction product which comprises reacting at atmospheric pressure 246 parts of tetramethylol melamine, with 93 parts of aniline at a temperature of approximately 80° C. until the reactants form a softened mass, raising the temperature to approximately 110° C. to bring the reactants completely into solution, lowering the temperature to 100° C. and maintaining the same for one-half hour, and subsequently cooling to room temperature to obtain a solid reaction product.

HERBERT J. WEST.

REFERENCES CITED

The following references are of record in the file of this patent:

UNITED STATES PATENTS

| Number | Name | Date |
|---|---|---|
| 2,285,750 | Swain | June 9, 1942 |
| 2,327,771 | D'Alelio | Aug. 24, 1943 |
| 2,328,593 | Widmer | Sept. 7, 1943 |
| 2,332,235 | Kistler | Oct. 19, 1943 |
| 2,377,868 | D'Alelio | June 12, 1945 |
| 2,409,906 | Scott | Oct. 22, 1946 |

FOREIGN PATENTS

| Number | Country | Date |
|---|---|---|
| 502,720 | Great Britain | Mar. 23, 1939 |